United States Patent
Berney

Patent Number: 5,673,238
Date of Patent: Sep. 30, 1997

[54] ELECTRONIC WATCH WITH MINUTE-REPEATER FUNCTION

[75] Inventor: Jean-Claude Berney, Les Charbonnières, Switzerland

[73] Assignee: Eta SA Fabriques d'Ebauches, Grenchen, Switzerland

[21] Appl. No.: 437,308

[22] Filed: May 9, 1995

[30] Foreign Application Priority Data

May 20, 1994 [CH] Switzerland ............. 01577/94

[51] Int. Cl.$^6$ .................................. G04B 19/04
[52] U.S. Cl. ............... 368/80; 368/223; 368/185; 368/190; 368/272
[58] Field of Search ............... 368/80, 72, 225, 368/184–199, 73–76, 245–250, 272

[56] References Cited

U.S. PATENT DOCUMENTS

| | | | |
|---|---|---|---|
| 4,474,480 | 10/1984 | Kato | 368/80 |
| 4,652,140 | 3/1987 | Nakazawa | 368/74 |
| 5,299,177 | 3/1994 | Koch | 368/73 |
| 5,379,281 | 1/1995 | Koch | 368/72 |

FOREIGN PATENT DOCUMENTS

| | | |
|---|---|---|
| 0366422 | 5/1990 | European Pat. Off. |
| 2012077 | 7/1979 | United Kingdom. |
| 2128379 | 4/1984 | United Kingdom. |

*Primary Examiner*—Bernard Roskoski
*Attorney, Agent, or Firm*—Griffin, Butler, Whisenhunt & Kurtossy

[57] ABSTRACT

An electronic watch with a minute-repeater function wherein the strike is accompanied by characteristic movements of the hands. In a simple alternative embodiment, the watch comprises two independent hour and minute hands, driven by their own motor. When the minute-repeater function is activated, the two hands come first of all to 0, then return to their initial position making movements corresponding to each type of strike, hour strike=+1 hour, 15 minutes strike=+15 minutes, etc.

7 Claims, 5 Drawing Sheets

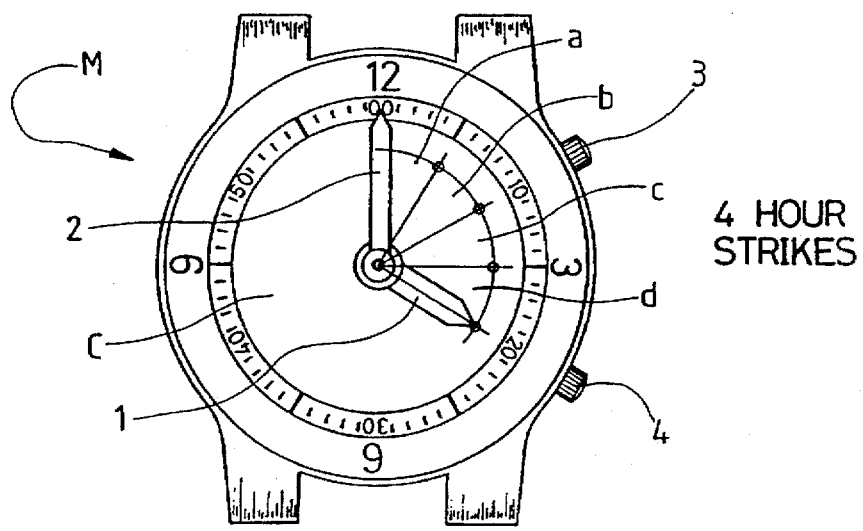
4 HOUR STRIKES
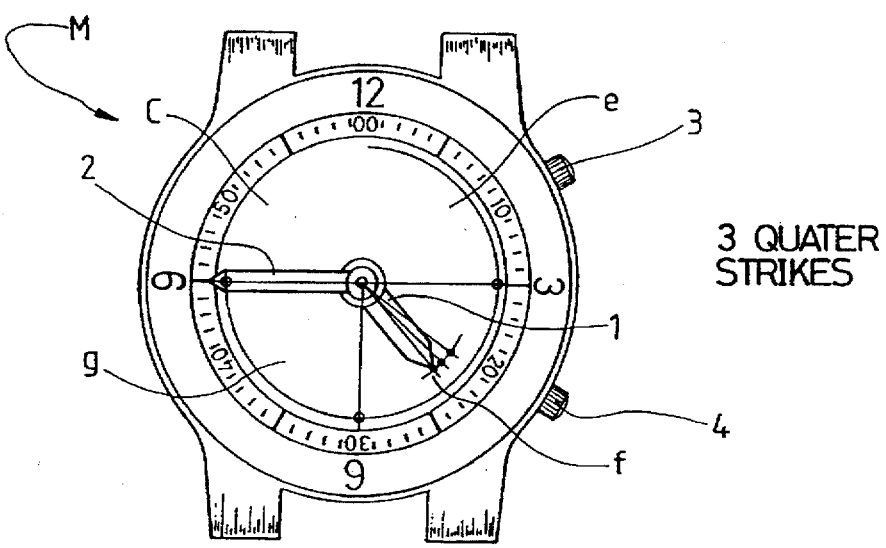
3 QUATER STRIKES
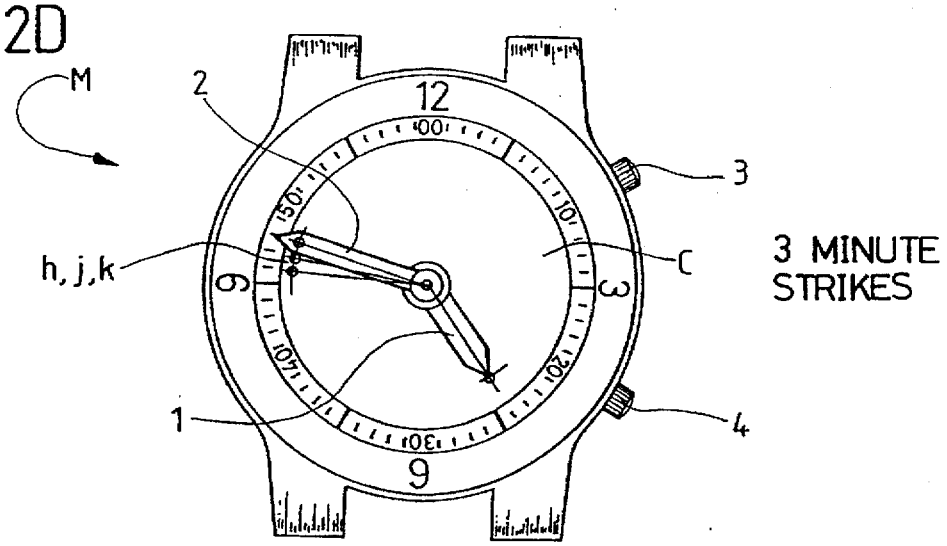
3 MINUTE STRIKES

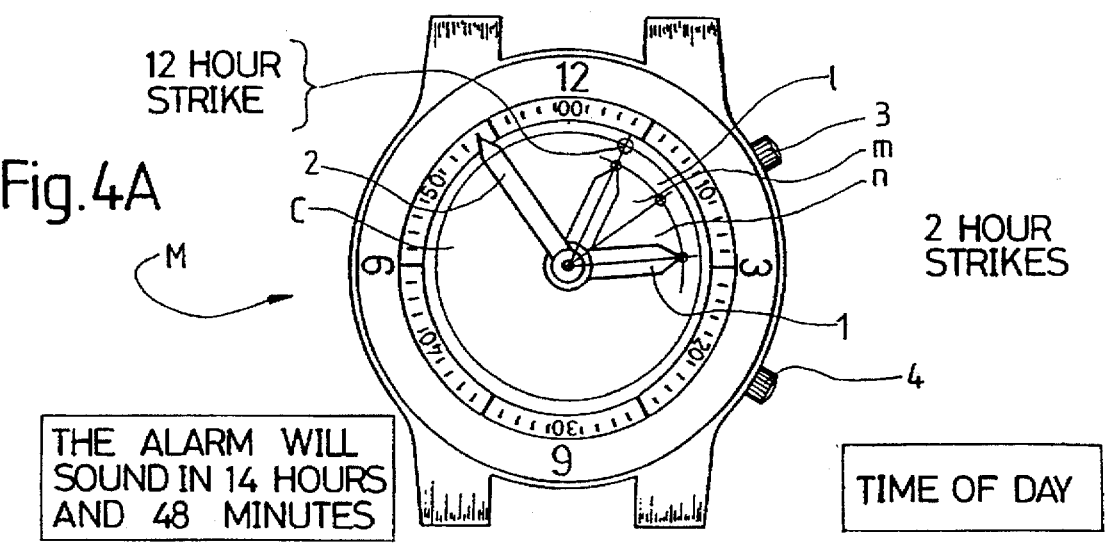
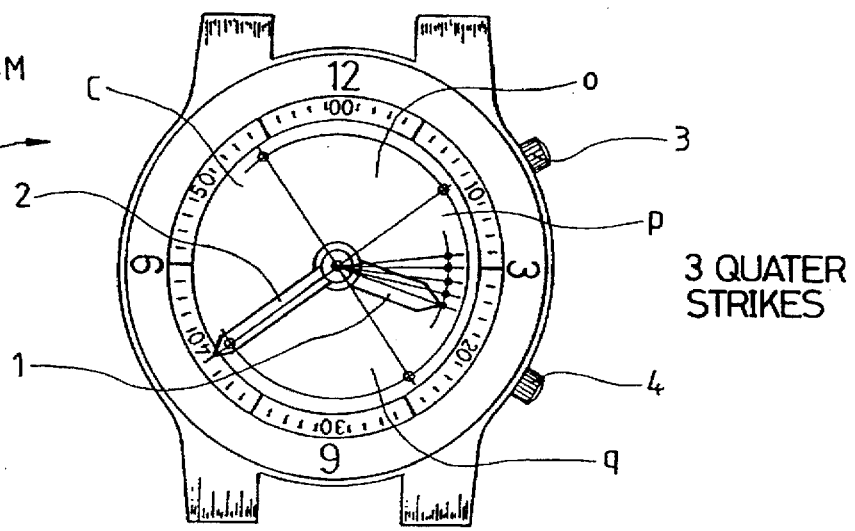
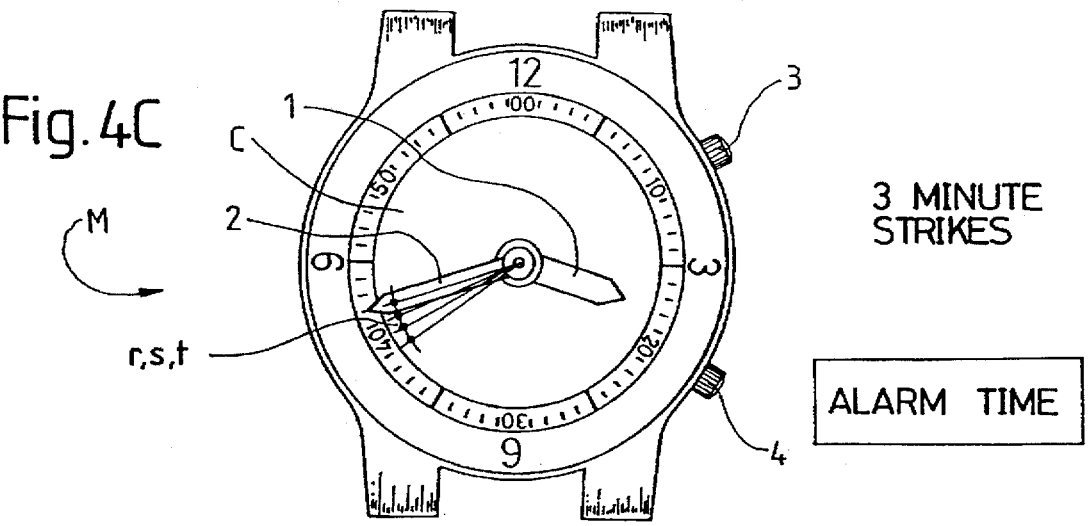

5,673,238

ELECTRONIC WATCH WITH MINUTE-REPEATER FUNCTION

FIELD OF THE INVENTION

The invention concerns an electronic watch with a minute-repeater function, and in particular a watch of this type in which the minute-repeater function is associated with a characteristic movement of its display means.

BACKGROUND OF THE INVENTION

Producing a minute-repeater function in an electronic watch does not a priori pose major problems as long as hour and minute counting means, and means for generating acoustic signals in connection with these hour and minute counting means are provided in the electronic circuit.

However, the signals emitted have only a distant relationship with the warm subtle gongs used in conventional clockmaking, so that this type of function loses a good part of its appeal.

The aim of the present invention is not to recreate a minute-repeater in the old style, but rather to take advantage of the possibilities of modern techniques to give this type of function an original feature attractive to the user.

SUMMARY OF THE INVENTION

The invention therefore concerns a watch with a minute-repeater function comprising control means, an electronic circuit, display means driven by at least one stepping motor and means for generating acoustic signals, said electronic circuit comprising at least hour counting means and minute counting means, said acoustic signal generating means being intended to produce acoustic signals in connection with said hour and minute counting means in response to an appropriate manipulation of the control means, characterised in that said electronic circuit is arranged to act on said display means in order to create characteristic movements of the latter in association with said acoustic signals.

Thus the synchronisation of the movement of the display means with the production of the acoustic signals gives the watch an original additional visual feature which makes it aesthetically more attractive.

BRIEF DESCRIPTION OF DRAWINGS

Other advantages and characteristics of the invention will appear upon reading the following description of embodiments of the minute-repeater watch of the invention given by way of non-limiting example, this description being made in connection with the attached drawings in which:

FIGS. 2A, 2B, 2C and 2D show schematically the watch according to the first embodiment representing the successive movements of the hour and minute hands, the latter coming on a command signal first of all to position 0 (12 o'clock), then returning to their initial position by movements in association with the different types of acoustic signals;

FIGS. 4A, 4B and 4C show schematically a second embodiment of the minute-repeater watch according to the invention in which the watch is used with an alarm function.

DESCRIPTION OF PREFERRED EMBODIMENTS

Figure 1:
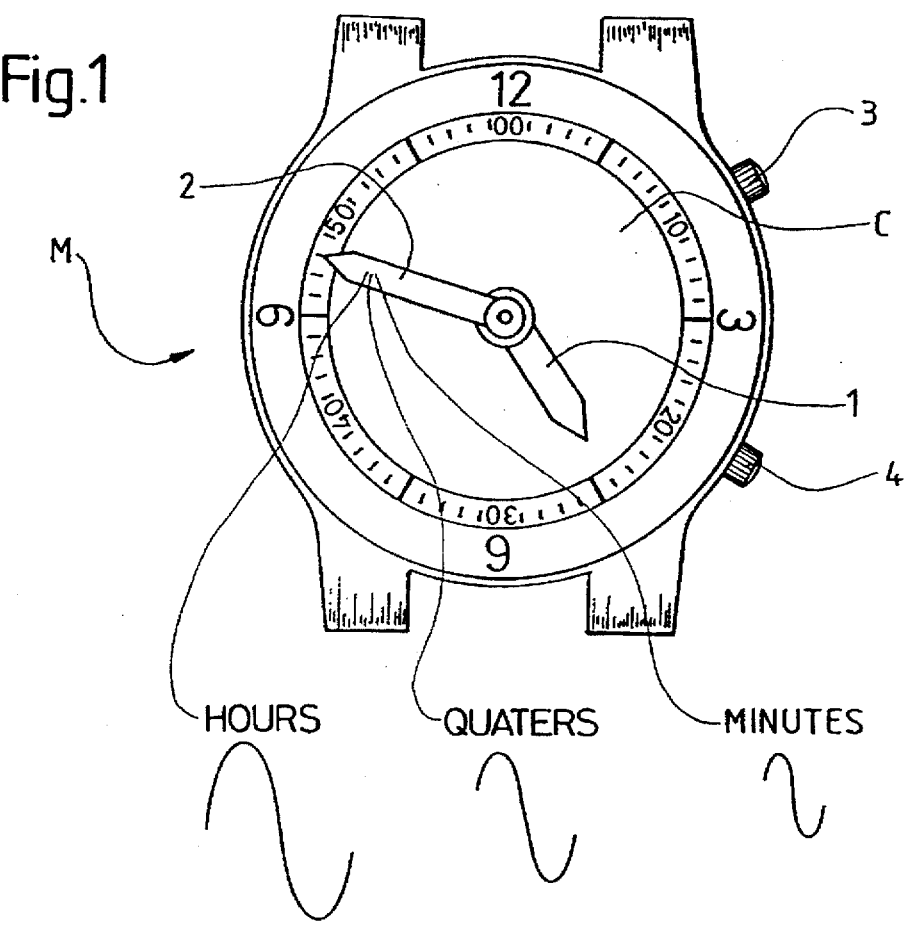
FIG. 1 shows schematically a first embodiment of a watch according to the invention with to-and-fro movements in association with the different types of acoustic signals.

FIG. 1 shows schematically a first embodiment of a minute-repeater watch M according to the invention comprising simply an hour hand 1 and a minute hand 2 moving over a dial C. Watch M comprises a stepping motor for driving hands 1 and 2 and an electronic circuit comprising amongst others hour and minute counting means and means for generating different types of acoustic signals in connection with these counting means. This electronic circuit will be described in more detail in connection with FIG. 3.

In order for the acoustic signals produced to be in connection with the hours and minutes displayed by hands 1 and 2, the latter must be synchronised with the internal hour and minute counting means. This is also only possible if there is a prior initialisation between these two systems. This initialisation may be carried out manually by bringing the two hands 1 and 2 to 0 or to the 12 o'clock position as has been represented in FIG. 2A, then by supplying an initialisation signal, for example via an appropriate manipulation of control means, shown here by two push-buttons 3 and 4. These two push-buttons 3 and 4 are also used to carry out time adjusting operations. It will be noted that these operations must be carried out in a completely electric manner if one wishes to avoid creating a phase shift between the hands and the internal counting means. The minute-repeater function is also started by an appropriate manipulation of push-buttons 3 and 4.

The synchronisation of the hands with the internal counting means enables the position of the hands to be permanently controlled, and notably to leave temporarily the position corresponding to the day time display and subsequently to return to this position. It is thus possible, during the minute-repeater function, to associate the characteristic movements of the hands with different types of acoustic signals generated by the electronic circuit. Three types of acoustic signals are generally provided corresponding to the hour-strike, quarter-strike and minute-strike respectively.

Thus in FIG. 1, admitting that the stepping motor is of the bidirectional type, to-and-fro movements of minute hand 2 can be created. These to-and-fro movements may for example be of three different amplitudes, corresponding respectively to the hour-strike, the quarter-strike and the minute-strike.

In the case shown in FIG. 1 in which the time displayed is 4.48 hours, when the minute-repeater function is operated via push-buttons 3 and 4, there will therefore be four movements of large amplitude corresponding to the four hour-strikes, three movements of medium amplitude corresponding to the three quarter-strikes, and three movements of small amplitude corresponding to the three minute-strikes.

Figure 2A:
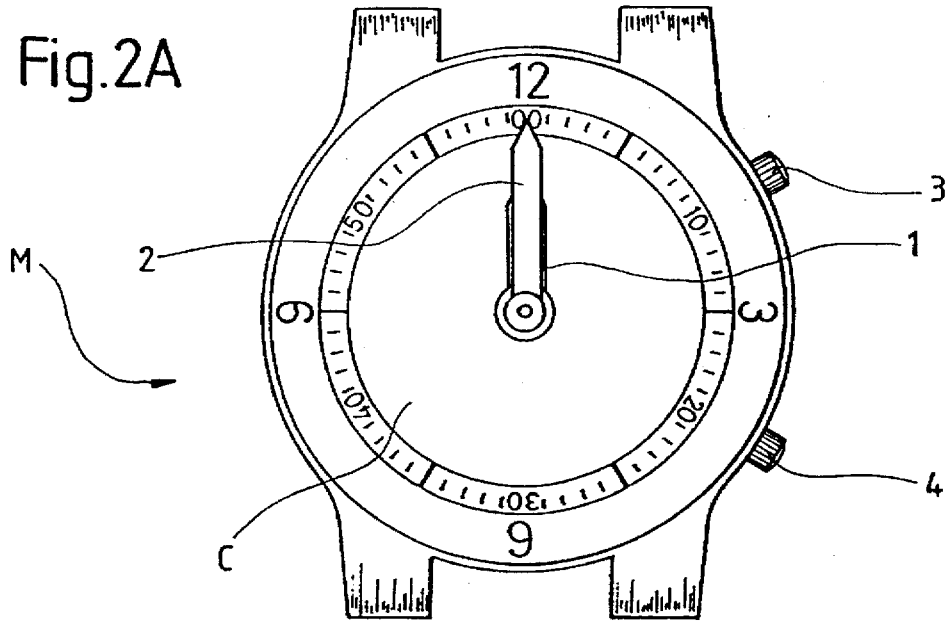

The fact that there is only one motor limits the possibilities of movement. That is why, for the description which follows, we will admit according to an alternative of the first embodiment of the invention, that minute and hour hands 1 and 2 are independent of each other, and are each driven by their own motor. It is thus possible, for example, to bring the two hands to 0, as shown in FIG. 2A, from a position in which they display the time of day, in a matter of a second when the minute-repeater function is operated.

Figure 3:
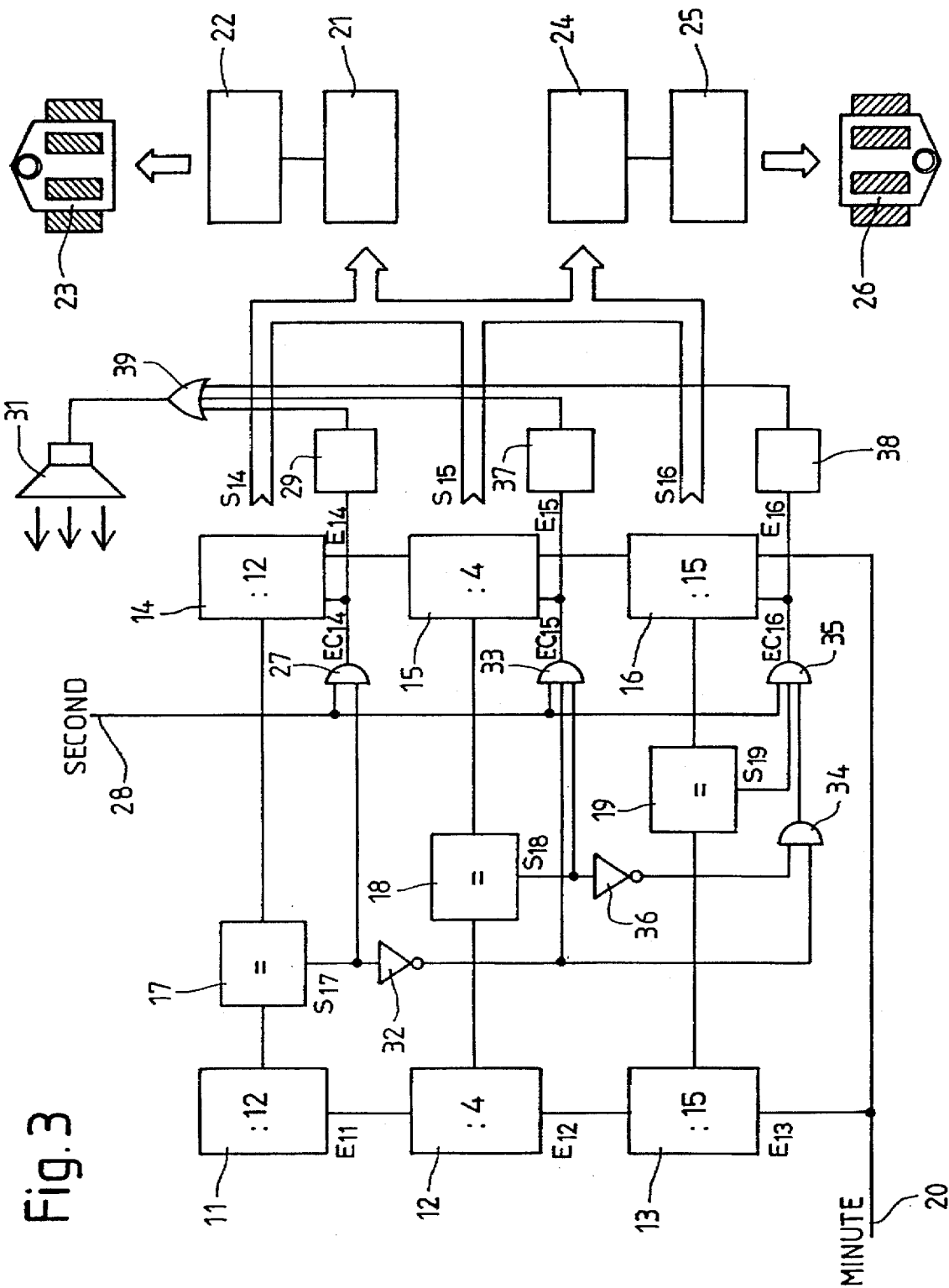
FIG. 3 shows a block diagram of a part of the electronic circuit of the watch according to FIG. 1.

Consequently it is possible to bring the hands back to their initial position (that is to say to reset the watch) by a succession of movements of the hour and minute hands in association with the acoustic signals generated by the electronic circuit shown in FIG. 3.

In FIG. 2B, the displacement of hour hand 1 has been shown, from position 0, by four 1 hour jumps respectively referenced a, b, c, d which correspond to the four hour-strikes generated by the electronic circuit. In FIG. 2C, the displacement of minute hand 2 has been shown, from position 0, by three 15 minute jumps respectively referenced e, f, g which correspond to the three quarter-strikes. Finally, in FIG. 2D the displacement of minute hand 2 has been shown, from its last position, by three 1 minute jumps respectively referenced h, j, k which correspond to the three minute-strikes. At this moment, hands 1 and 2 have returned to their initial position and display the correct time.

One could of course reverse the process and bring hands 1 and 2 to position 0 by movements in association with the acoustic signals, then automatically bring them back to the correct time display after a few seconds.

FIG. 3 shows the block diagram of a part of the electronic circuit of the watch of FIGS. 2A-2D. The hour and minute counting means can first be recognised comprising a first group of counters, namely a counter-by-twelve for the hours 11, a counter-by-four for the quarters 12 and a counter-by-fifteen for the minutes 13.

The electronic circuit also comprises a second group of counters configured in the same manner as the previous group, namely counters by-twelve, by-four and by-fifteen, respectively referenced 14, 15 and 16. The first group of counters 11, 12 and 13 is connected to the second group of counters 14, 15 and 16 by three comparator circuits respectively referenced 17, 18 and 19, which supply at their respective outputs a logical signal 1 when their inputs are not equal. The two groups of counters 11, 12, 13 and 14, 15, 16 receive at their respective inputs E11, E12, E13, E14, E15, E16 signals 20 of a period of one minute. Thus, the two groups of counters 11, 12, 13 and 14, 15, 16 are normally synchronised and their contents remain equal.

Outputs S14, S15 and S16 of counters 14, 15 and 16 are connected to two correspondence tables 21 and 24. The first table 21 fixes the position of hour hand 1 on dial C as a function of the states of counters 14, 15 and 16. This table 21 is connected to a circuit 22 for positioning hour hand 1 on dial C which supplies driving pulses to a motor 23, for example of the stepping type, until hand 1 has reached the position determined by table 21.

Similarly, the second table 24 fixes the position of minute hand 2 on dial C as a function of the states of counters 14, 15 and 16. This table 24 is connected to a circuit 25 for positioning minute hand 2 on dial C which supplies driving pulses to motor 26 until hand 2 has reached the position determined by table 24.

Let us now consider what happens with regard to hour counter 14 in the case where the group of counters 14, 15 and 16 is reset to 0, and by referring to the example of FIGS. 2A to 2D. Output S17 of comparator circuit 17 gives an inequality signal and passes to 1. Output S17 goes to the first input of an AND gate 27 whose second input receives a second signal 28. This signal then passes to a complementary input EC14 of counter 14 and concurrently to the input of a generator of hour signals 29. The output of this generator is connected to a first input of an OR gate 39 whose output supplies a mini loudspeaker 40. Thus at each pulse of second signal 28, counter 14 is increased by one step and an acoustic hour signal is generated. After 4 pulses of the second signal, the content of counter 14 is again equal with the content of counter 11, and the process is interrupted.

However, by passing to 1, the output of comparator 17, via the intermediary of inverter 32, has blocked AND gate 33, and AND gate 35 via the intermediary of AND gate 34. AND gates 33, 34 and 35 thus fix priorities so that counter 14 is corrected first, counter 15 second and counter 16 last.

When the content of counter 14 is again equal to the content of counter 11, output S17 of comparator 17 returns to 0 and the output of inverter 32 to 1. The output of inverter 32 goes to the inputs of AND gates 33 and 35. As the contents of counter 15 and 12 are not equal, outputs S18 and S19 of comparators 18 and 19 are at 1 and the output of inverter 26 is at 0. As a result, AND gate 35 remains blocked, whilst gate 33 is unblocked, allowing second signals 28 to pass to the complementary input EC15 of counter 15 and to the input of a second generator of quarter signals 37 whose output goes to a second input of OR gate 39 and thus to loudspeaker 31. At each pulse of second signal 28, counter 15 is thus incremented by one step and an acoustic quarter signal is generated. After three pulses of the second signal, the content of counter 15 again becomes equal to the content of counter 12, and the process is interrupted.

Finally, as the contents of counters 15 and 12 are equal, and the contents of counters 16 and 13 are still not equal, the outputs of inverters 32 and 36 are at 1, which causes the output of AND gate 34 to pass to 1. As output S19 of comparator 19 is also at 1, AND gate 35 allows the pulses of second signal 28 to pass to complementary input EC16 of counter 16 and to the input of a third generator 38 of minute signals, which supplies these signals by OR gate 39 to loudspeaker 40. At each pulse of second signal 28, counter 16 is thus incremented by one step and an acoustic minute signal is generated. After three second signal pulses, the content of counter 16 is again equal to that of counter 13, and the process is definitively interrupted as the contents of the two groups of counters are respectively now perfectly equal, and it can be seen that the two hands 1 and 2 have returned to their initial position and again indicate the correct time.

It is quite clear that the acoustic hour, quarter and minute signals must be well distinguished so that the user can recognise them without any problem.

There are of course numerous other possible combinations, but a description of them would add nothing to the understanding of the object of the invention. For example, for watches having more than two hands, and having complementary analogue displays for displaying accessory functions like the chronograph function, the desired movements according to the invention can be created on these complementary analogue displays.

Figure 5:
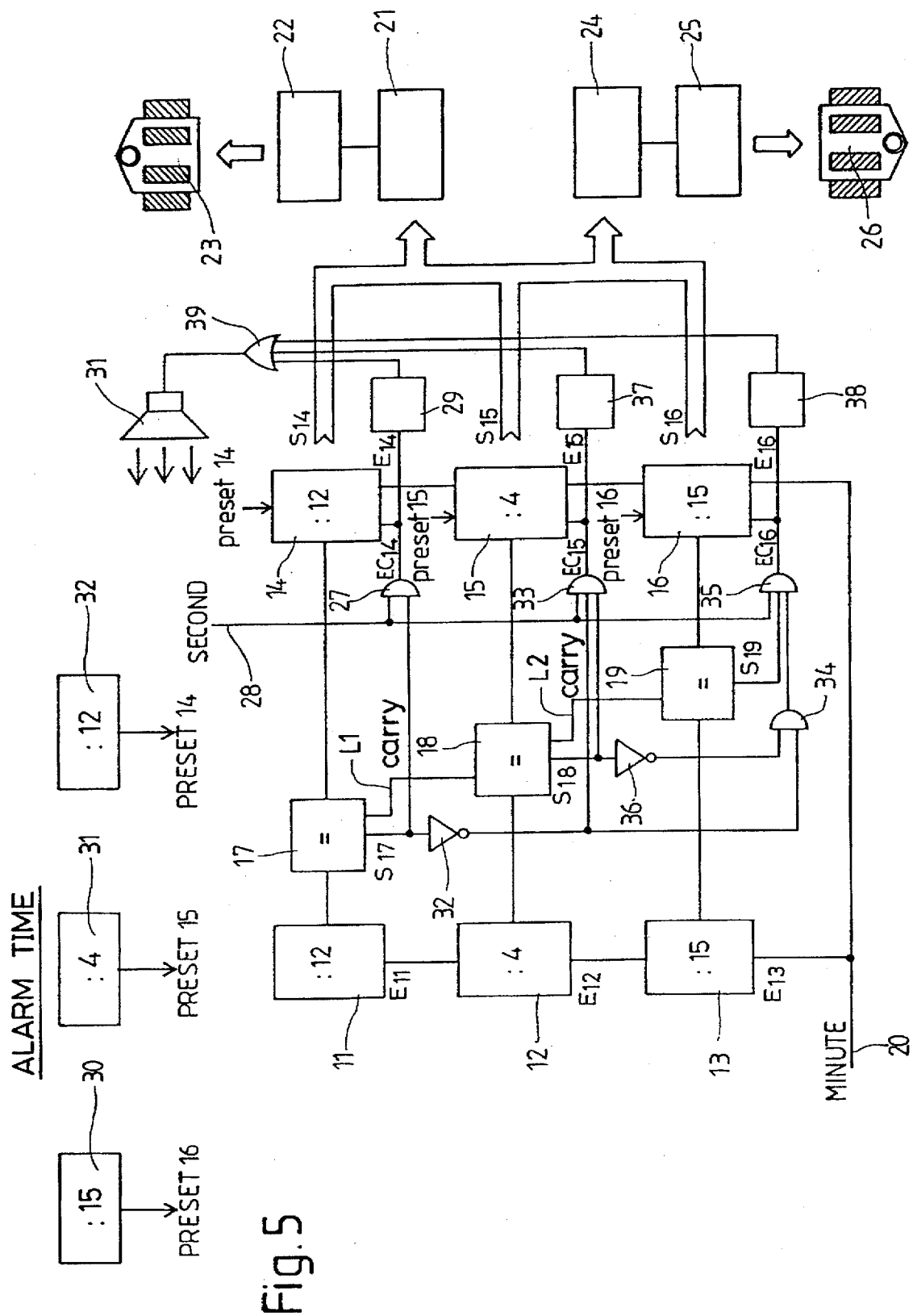
FIG. 5 shows a block diagram of a part of the electronic circuit of the watch according to FIGS. 4A–4C.

Referring now to FIGS. 4 and 5, one can see a representation of a second embodiment of a minute-repeater watch comprising two hands driven by independent motors according to the invention and in which the same elements are designated by the same numerical references.

According to an important feature of this second embodiment, watch M comprises an alarm function, and enables, according to the invention, the time remaining until a programmed alarm time to be indicated in an acoustic manner.

In the embodiment described previously in connection with FIGS. 1 to 3, the number and the nature of the characteristic movements of the hands which are associated with the acoustic signals emitted when the push-buttons are manipulated in an appropriate manner, reveal the difference between the position of the hands at the moment when the push-button is actuated, that is to say when they indicate the standard time Tn and a reference position in which the two hands are at 0 (in the 12 o'clock position, see FIG. 2) and thus the equation Tn−0=Tn.

Now, this principle may be applied in another configuration in which the reference is different from 0 and is, for example, equal to a preprogrammed alarm time.

According to this embodiment and in the case of a 24 hour alarm, an additional so-called 12 hour strike having a characteristic tonality must be added. This strike corresponds to a complete turn of the hour hand.

An example of the implementation of this second embodiment of the invention for the acoustic indication of the time still available before a preprogrammed alarm time will now be described below in connection with FIGS. 4A to 4C.

In this example, the time of day is 12.54 hours and the programmed alarm time is 03.42 hours. Since the difference between the time of day and the alarm time is greater than 12 hours, the 12 hour strike will be activated.

When push-buttons 3 and 4 are manipulated in an appropriate manner, the 12 hour strike is generated, this strike being accompanied by a complete turn referenced 1 of hour hand 1, from the position in which it indicates the time of day, then two hour strikes with a corresponding displacement of hour hand 1 of two hour jumps referenced respectively m and n, then three quarter hour strikes with a corresponding displacement of minute hand 2 of three 15 minute jumps referenced respectively o, p and q, and finally three minute strikes with a corresponding displacement of minute hand 2 of three minute jumps referenced respectively r, s and t. These different strikes thus represent 14 hours and 48 minutes, namely the time remaining until the alarm is activated.

The block diagram of a part of the electronic circuit of this second embodiment of the watch according to the invention is illustrated in FIG. 5.

The control circuit of this second embodiment is distinguished from that of FIG. 3 in that it comprises three additional alarm counters 30, 31 and 32 respectively counters by-15, by-4 and by-12 in which the alarm time is stored, in that counters 14, 15 and 16 are replaced by counters of the preset type, that is to say comprising an input, respectively PS30, PS31 and PS32 into which a predetermined value can initially be introduced, and in that alarm counters 30, 31 and 32 are respectively connected to the preset input of counters 14, 15 and 16.

Further, in order to avoid an incorrect operation of the circuit at the moment of the comparison by comparators 17, 18 and 19 respectively between the content of counters 11 and 14, and between the content of counters 12 and 15, carries from comparator 17 to comparator 18 and from the latter to comparator 19 have been introduced. When the content of counter 13 is less than that of counter 16, 1 must be subtracted from the content of counter 12 and when the content of counter 12 is less than that of counter 15, 1 must be substracted from the content of counter 11, and this is done solely with regard to the comparators and without forgetting to carry the value subtracted in quarters or in minutes over to the values of counters 12 and/or 13, this carry is represented by the connections L1 and L2 between comparators 17 and 18 and comparators 18 and 19 respectively.

Thus, when push-buttons 3 and 4 are manipulated in an appropriate manner, the content of alarm counters 30, 31 and 32 is transferred into counters 14, 15 and 16 then compared respectively to the contents of counters 11, 12 and 13. In other words, the alarm time must be subtracted from the time of day and the result of this difference must be transposed into whole hours, quarters and minutes in order to connect this result to the strikes and/or the movements of the minute-repeater function.

For example, if the time of day is 11.42 hours, hour counters 11, 12 and 13 contain respectively the following values: 11, 2 and 12, and if the alarm time is 10.58 hours, the alarm counters after the transfer into counters 14, 15 and 16 contain respectively the following values: 10, 3 and 13. Since the content of counter 13 is less than the content of counter 16 one will subtract 1 from the content of counter 12, and since the content of counter 12 is less than the content of counter 15, one will subtract 1 from the content of counter 11. It goes without saying that these two subtractions are accompanied by a carry of 15 and 4 respectively into counters 13 and 12 solely with regard to the comparators. The subtraction is thus as follows:

|  | HOURS | QUARTERS | MINUTES |
|---|---|---|---|
| Time of day A | 11 | 2 | 12 |
| Alarm time B | 10 | 3 | 13 |
| A with carry = A' | 11 − 1 = 10 | 2 − 1 + 4 = 5 | 12 + 15 = 27 |
| A' − B = C | 10 − 10 = 0 | 5 − 3 = 2 | 27 − 13 = 14 |

The result C of the subtraction of the time of day and consequently the time which remains before the alarm time is thus provided, in the form of hours, quarters and minutes. In this example, the electronic circuit of the watch will not generate hour strikes but will generate two quarter strikes and 14 minute strikes.

Of course in the case of a 12 hour alarm, the 12 hour strike is omitted, and the principle described above remains the same.

According to an advantageous alternative embodiment, the control circuit can be arranged so that when the alarm function is set off, the strikes are set off and only the characteristic movements of the hands are controlled in response to a manipulation of the push-buttons. Conversely, when the alarm function is set on, the movements of the hands are associated with the corresponding strikes in response to a manipulation of the push-buttons. In this way, the control of the on/off state of the alarm is ensured in an attractive manner.

Further, rather than jumps of fifteen minutes, one could use jumps of six minutes, which would facilitate the counting of the minutes.

According to another alternative, the control circuit may be arranged to reverse the process by changing the direction of rotation of the hands. In this case, the hour and minute hands will be moved first of all to display the alarm time, namely 03.42 hours, then will be returned to the time of day while generating the corresponding strikes. This alternative has the advantage of enabling the alarm time to be checked immediately.

I claim:
1. A watch with a minute-repeater function, said watch comprising:
control means, an hour hand and a minute hand driven by at least one stepping motor for displaying the time of day when the hands are in a normal position, and an electronic circuit comprising hour and minute counting means and means for generating hour and minute acoustic signals in connection with these counting means and in response to manipulation of said control means, said electronic circuit being arranged to act on said hour and minute hands so that, in response to said manipulation of the control means, the hands pass from said normal position to a reference position and then return to said normal position, and that said hands perform characteristic movements in association with said hour and minute acoustic signals when the hands pass between said normal position and said reference position.

2. A watch according to claim 1, wherein said reference position is one in which said hour hand and minute hand are at 0.

3. A watch according to claim 1, wherein said reference position is one in which said hour hand and minute hand display a preprogrammed alarm time.

4. A watch according to claim 1, wherein said electronic circuit further comprises quarter counting means, said means for generating hour and minute acoustic signals comprises means for generating quarter acoustic signals, and said electronic circuit acts on said minute hand so that said minute hand also performs characteristic movements in association with the quarter acoustic signals when the hands pass between said normal position and said reference position.

5. A watch according to claim 4, wherein said hour hand and minute hand are independent of each other and each hand is driven by a respective one of two motors.

6. A watch according to claim 5, wherein the characteristic movements of the hour hand and minute hand comprise, for the hour hand, in performing a step of one hour each time that an hour acoustic signal is generated, and for the minute hand in performing a step of fifteen minutes for each quarter acoustic signal and a step of one minute for each minute acoustic signal.

7. A watch according to claim 1, wherein said hour hand and minute hand are independent of each other and each hand is driven by a respective one of two motors.

* * * * *